United States Patent [19]

Erickson

[11] 4,441,186

[45] Apr. 3, 1984

[54] ELECTRONICALLY SWITCHABLE MULTIWAVELENGTH LASER SYSTEM

[75] Inventor: Edward G. Erickson, Sunnyvale, Calif.

[73] Assignee: GTE Products Corporation, Stamford, Conn.

[21] Appl. No.: 336,195

[22] Filed: Dec. 31, 1981

[51] Int. Cl.³ .............................................. H01S 3/10
[52] U.S. Cl. ........................................ 372/19; 372/12; 372/23; 372/26; 372/98; 350/356
[58] Field of Search .................... 372/12, 10, 19, 13, 372/23, 26; 328/33, 98, 105, 106, 22; 350/356

[56] References Cited

U.S. PATENT DOCUMENTS

| | | | |
|---|---|---|---|
| 3,713,032 | 1/1973 | Wentz | 372/12 |
| 3,719,414 | 3/1973 | Wentz | 372/98 |
| 3,740,663 | 6/1973 | Andringa | 372/12 |

OTHER PUBLICATIONS

Wentz; "Electrooptical Q-Switching Technique for Randomly Polarized Laser Sources;" Proc. IEEE, Mar. 1972.

Primary Examiner—William L. Sikes
Assistant Examiner—Leon Scott, Jr.
Attorney, Agent, or Firm—John F. Lawler

[57] ABSTRACT

An electronically switchable multiwavelength laser system comprises a lasing medium capable of generating a beam having at least two different wavelengths, an anisotropic birefringent component in optical alignment with the medium for refracting the beam into spatially separate polarized rays containing both wavelengths, and another electrically controllable anisotropic electrooptically active element, such as a Pockels' cell, having electrodes aligned with the respective rays and selectively energizable to block either ray to permit the laser to oscillate at the wavelength and polarization of the unblocked ray. The laser system includes highly reflective and partially transmissive mirrors defining the laser cavity and assisting in wavelength discrimination, the birefringent component and Pockels' cell being disposed in series between the lasing medium and the highly reflective mirror.

Another embodiment comprises a tunable laser having a continuum output over a band of wavelengths, the Pockels' cell being selectively energized with a precise voltage which enhances lasing at the selected wavelength and inhibits operation at other wavelengths.

10 Claims, 5 Drawing Figures

ELECTRONICALLY SWITCHABLE MULTIWAVELENGTH LASER SYSTEM

BACKGROUND OF THE INVENTION

This invention relates to lasers and more particularly to an electronically switchable multiwavelength laser system.

Many lasing materials exhibit the capability of producing laser section at several different wavelengths. As an example, a Nd:YAG (neodymium yttrium aluminum garnet) laser can be caused to lase at many different wavelengths from approximately 970 nanometers to 1800 nanometers, two of the strongest lines in that range being at 1064 nanometers and 1318.8 nanometers (commonly referred to as $1.06\mu$ and $1.32\mu$, respectively). To change from one wavelength to another it has been necessary in the past to mechanically change or replace all or part of the optical components within the laser resonator. This technique is tedius and time consuming and necessitates inactivation of the laser during this period.

The need to switch between optical wavelengths rapidly is exemplified in the field of optical ranging through the atmosphere by means of an optical radar system. Operation of such a ranging system at a single wavelength can result in atmospheric refraction errors of several feet for a range of 20-100 Km. Utilization of two wavelengths simultaneously or immediately following one another enables a measure of refractive effects of the atmosphere on the beam to produce considerably more accurate range information. More specifically, the refractive effects at one wavelength are different from those effects at another wavelength and this measurable difference enables compensation of the refractive effects of the atmosphere. There is no known laser system which is capable of rapidly switching between two or more different wavelengths so as to have utility for this purpose.

This invention is directed to a system and method which overcomes the above problems.

OBJECTS AND SUMMARY OF THE INVENTION

A general object of the invention is the provision of a laser system having an output that is rapidly switchable from one wavelength to another.

A further object is the provision of an economical and compact laser system which is capable of electronically switching its output from one wavelength to another.

Still another object is the provision of a method of rapidly switching a laser beam from one wavelength to another.

These and other objects of the invention are achieved in a multiwavelength laser system having a birefringent component and an electrooptically active element such as a Pockels' cell in a series in the laser cavity and in the beam path. The birefringent component separates the multiwavelength beam into rays having different wavelengths and different states of polarization, and the electronically actuated electrooptically active element is operated to selectively change the polarization of the rays to block propagation of all rays except the one having the selected wavelength.

DESCRIPTION OF PREFERRED EMBODIMENTS

Figure 1:
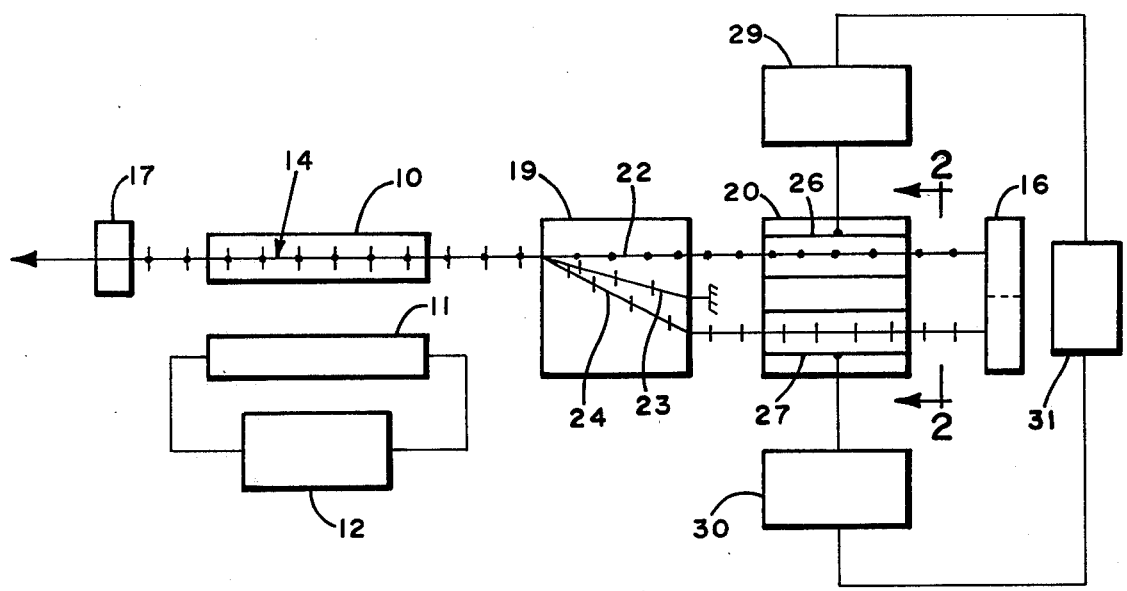
FIG. 1 is a schematic block diagram of a complete laser system embodying the invention.
Figure 2:
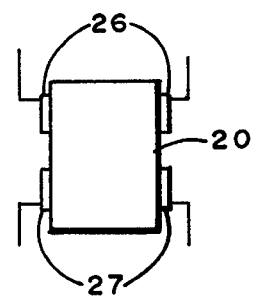
FIG. 2 is an end view of the electrooptically active element as viewed on line 2—2 of FIG. 1.

Referring now to the drawings, a laser system embodying the invention is illustrated in FIG. 1 and comprises a multi-wavelength lasing medium 10 optically pumped by a lamp 11 driven by a power source 12 to produce a beam 14 of coherent light along the laser axis. The laser has a cavity defined by a reflector or mirror 16 which is highly reflective at the operating wavelengths of the laser and a partially transmissive reflector or mirror 17 through which a portion of the laser beam is coupled out of the cavity as the laser output indicated by the arrow.

Disposed between lasing medium 10 and reflector 16 in optical alignment with beam 14 are an optically active birefringent component 19 and an electrooptically active element 20 such as a Pockels' cell. Component 19 consists of an anisotropic material such as calcite or sodium nitrate having the property of spatially separating the emission from lasing medium 10 into linearly polarized rays 22, 23 and 24. Ray 22 has a polarity which is, for example, horizontal as indicated by the dots and rays 23 and 24 have polarities which are the same and are orthogonal to that of ray 22 and indicated as being vertical in this example by the short vertical lines. Ray 22 is the ordinary or O ray and rays 23 and 24 are the extraordinary or E rays. E rays 23 and 24 are refracted within component 19 at angles which are wavelength dependent.

Assume by way of example that lasing medium 10 is a Nd:YAG crystal and that the fluorescent emission therefrom as beam 14 produces in component 19 a horizontally polarized O ray 22 at wavelengths of $1.06\mu$ and $1.32\mu$ and vertically polarized E rays 23 and 24 at wavelengths of $1.06\mu$ and $1.32\mu$, respectively. In practice the wavelength of O ray 22 is $1.06\mu$ since this is the dominant or strongest mode of the Nd:YAG laser. As shown, propagation of ray 23 may be permanently inhibited or blocked if required by means of a non-transmissive or non-reflective element so that the output of component 19 is two orthogonal linearly polarized spatially separated rays 22 and 24 having two different wavelengths. Under certain conditions, the wavelengths of interest may not be separated sufficiently to allow discrimination by spacial separation alone. In this case, mirror 16 may require multiple coatings to assist in wavelength discrimination.

Component 20 comprises a transparent crystal such as lithium niobate having a first set of electrodes 26 engaging the sides of component 20 in alignment with O ray 22 and a second set of electrodes 27 similarly mounted on the sides of component 20 in alignment with E ray 24. Electrodes 26 are energized by an electronic driver 29 such as a triggered thyratron and electrodes 27 are similarly energized by an electronic driver 30. Drivers 29 and 30 are electrically connected to an electronic switch 31 such as a pulse generator which controls the alternate operation of the drivers. Component 20 is fabricated in such a manner that when the proper voltage is applied to either electrode 26 or 27, an electrically induced birefringence occurs in the component causing a 45° rotation of polarization of the ray passing through the portion of component 20 between the energized electrodes. Upon reflection of this ray from mirror 16 and back through component 20, the polarization of the ray is rotated an additional 45° for a total of 90° from the original polarization. As a result of this polarization shift, the ray is refracted away from its original path through element 19 and laser oscillation at the wavelength of that ray is inhibited.

The technique of Q-switching for turning lasers on and off is well-known in the art and is explained, for example, in an article entitled "Electro-Optical Q-Switching Technique for Randomly Polarized Laser Sources" by Wentz, Proceedings of the IEEE, March 1972, page 343. In accordance with this invention, component 19, element 20 and mirrors 16 and 17 are modified so as to permit the output of the laser to be electronically switched from one wavelength to another.

Figure 3:
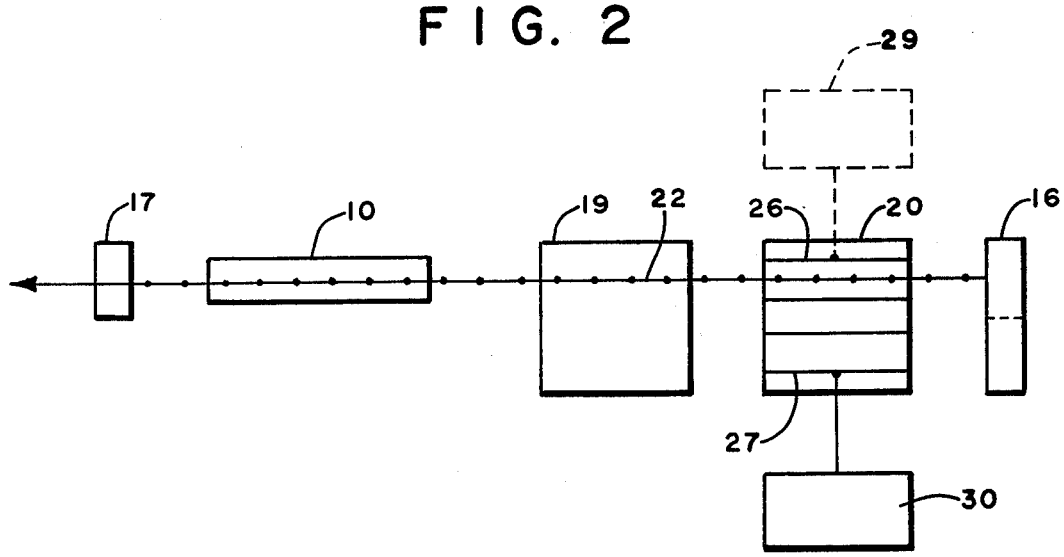
FIGS. 3 and 4 are partial schematic diagrams similar to FIG. 1 illustrating the operation of the system at two different wavelengths.
Figure 4:
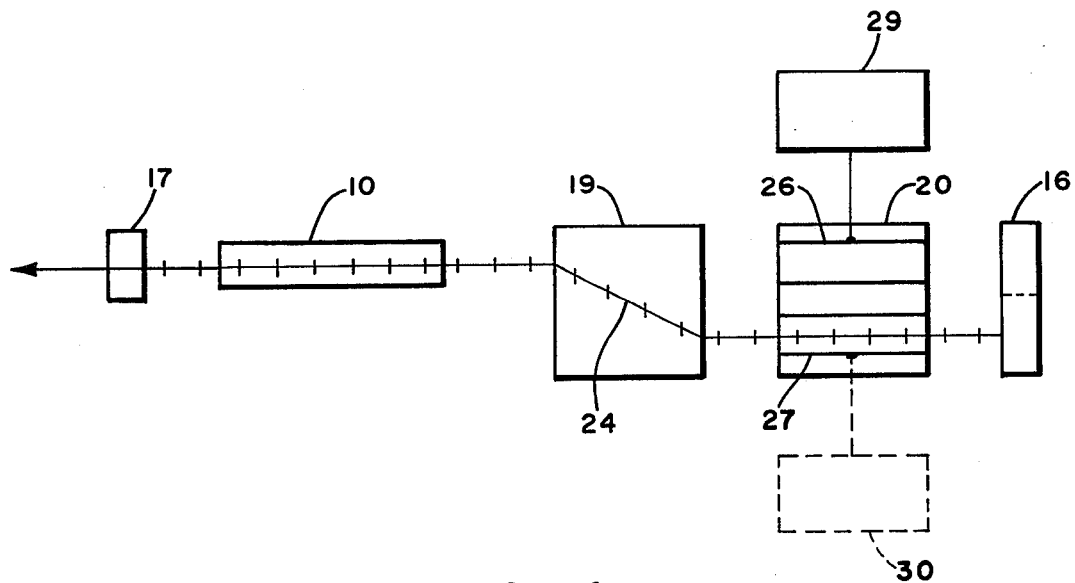

The operation of the laser system embodying this invention is illustrated schematically in FIGS. 3 and 4. Assume that the lasing medium 10 is a Nd:YAG crystal with the strongest transition at $1.06\mu$ and the next strongest transition at $1.32\mu$. As shown in FIG. 3, driver 30 is turned on (as indicated by the solid lines) and energizes the lower electrode set 27 on element 20. Driver 29 is turned off (as indicated by the broken lines) so that electrode set 26 is not energized. Due to the polarization rotation action of the portion of element 20 between electrodes 27, ray 24 having a wavelength of $1.32\mu$ is inhibited while ray 22 at $1.06\mu$ is uninhibited and causes the laser to oscillate and produce an output at $1.06\mu$. Upon activation of switch 31 to turn driver 29 on and driver 30 off as indicated in FIG. 4, the polarization rotation action of element 20 and, in this example, an additional wavelength discrimination provided by a mirror 16 which has been coated for a high reflectivity at $1.32\mu$ and a low reflectivity at $1.06\mu$ (in the area of mirror 16 upon which ray 24 is incident), inhibits ray 22 at $1.06\mu$ while permitting propagation of ray 24 at $1.32\mu$. The laser therefore oscillates at and produces an output of $1.32\mu$. Typically the time required for switching laser operation between these two wavelengths is approximately 0.05 $\mu s$ depending upon the specific gain of the laser medium and other factors relating to the dynamics of laser oscillation. This rapid switching capability allows two or more Q-switched pulses to be emitted from the laser during one flashlamp firing period, each at different wavelengths, by proper control of electrical signals applied to the electrode sets 26 and 27.

Figure 5:
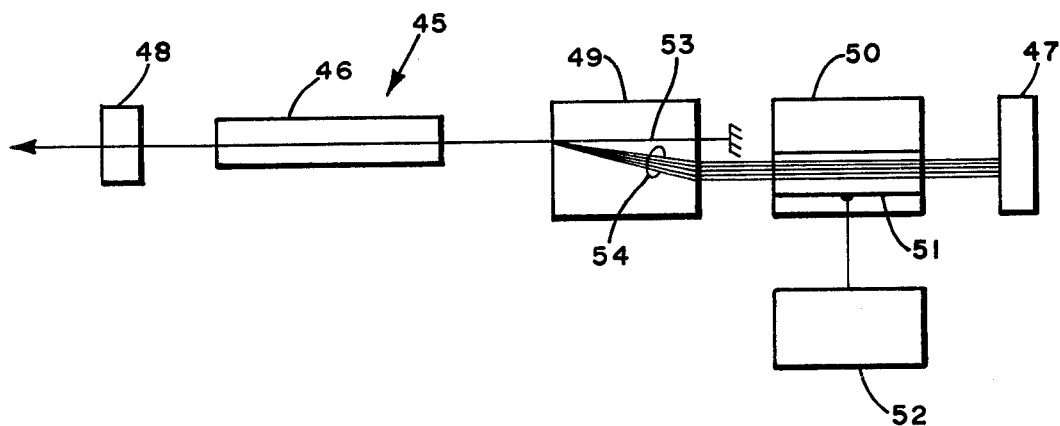
FIG. 5 is a schematic block diagram of an alternate laser system embodying the invention.

Another embodiment of the invention is illustrated in FIG. 5 and comprises a laser system 45 having a lasing medium 46 such as alexandrite which, when optically pumped, produces a continuum output having wavelengths from approximately 700 nanometers to 800 nanometers. Mirror 47 is highly reflective at those wavelengths and mirror 48 is partially transmissive at those wavelengths so as to couple the output from the laser resonator. Birefringent component 49 and Pockels' cell 50 are aligned along the laser optical axis as described above between medium 46 and mirror 47. Element 50 has one set 51 of electrodes on opposite sides thereof adapted to be energized by a driver 52 having an output voltage that is continuously tunable over the desired range. Element 49 separates the emission from medium 46 into an O ray 53 which is permanently blocked as shown (if required) and into a plurality of E rays 54 which pass through element 50 between electrodes 51. The wavelengths of E rays 54 for alexandrite, for example, range from 700 nanometers to 800 nanometers.

The nature of the emission from the alexandrite lasing medium 46 is such that enhancing emission at one of the wavelengths within the operating band causes lasing action to be inhibited at the other wavelengths. Such enhancement of a single wavelength mode is accomplished by applying a specific voltage to electrodes 51 that produces precisely a 90° rotation of the polarization of the selected wavelength corresponding to that voltage. Application of such a voltage to electrodes 51 causes the polarization of the E ray having the selected wavelength to rotate 90° on each pass through element 50 for a total of 180° rotation of polarization so that it passes uninhibited through component 49. By tuning the output voltage of driver 52 across the required range, the laser is caused to oscillate at any one of the plurality of wavelengths in the operating band of the lasing medium and to produce an output having the selected wavelength. By way of example, in applying a voltage from driver 52 to electrodes 51 for enhancing the ray having a wavelength of 720 nanometers, all other wavelengths in the band experience a substantial optical loss and the laser emits at approximately 720 nanometers. By changing the output of driver 52 to a voltage which enhances a different wavelength, say 760 nanometers, the laser oscillation almost instantaneously shifts to that selected wavelength so that the laser output is changed correspondingly. By initially applying a voltage corresponding to 45° of rotation (single pass) at a specific wavelength and then (during the flashlamp pulse period) causing a voltage to be applied corresponding to a 90° rotation (single pass) at that wavelength, the laser can be caused to emit a Q-switched pulse at a predetermined wavelength. By varying the voltage applied to electrodes 51 either during the Q-switched pulse or at any other time that the laser is oscillating, the output wavelength will shift accordingly and thus be frequency modulated.

The invention in its broadest aspect is applicable to laser systems having any type of multiwavelength lasing media such as certain dyes, gases and other solid state substances. The foregoing description is given by way of example and not by way of limitation, the invention being defined in the appended claims.

What is claimed is:

1. A laser system comprising
  a lasing medium capable of generating a beam of coherent light having at least two different wavelengths,
  means for optically pumping said medium,
  first and second optical reflectors optically aligned with and spaced from opposite ends of said medium and defining therebetween an optical cavity of the laser system, one of said reflectors being highly reflective at said two wavelengths, the other of said reflectors being partially transmissive at said two wavelengths whereby to couple an output from said cavity.
  a birefringent component and an electrooptically active element in optical alignment with said medium and said one of said reflectors, said component refracting said beam into orthogonally polarized rays having said first and second wavelengths, said element having electrode means aligned with said rays and having the property of rotating the polarization of said rays when said electrode means are energized, and means for selectively energizing said electrode means to inhibit propagation of the ray at said first wavelength and to permit propagation of the ray at said second wavelength whereby the laser oscillates and produces an output at said second wavelength.

2. The system according to claim 1 in which said component refracts said beam into an ordinary (O) ray having a first wavelength and into a spatially separated extraordinary (E) ray having said second wavelength, said electrode means comprising a first set of electrodes aligned with said O ray and second set of electrodes aligned with said E ray, means for selectively energizing one of said sets of electrodes and thereby changing the polarization of the ray aligned with the one set whereby to block propagation thereof and cause the laser to oscillate at the wavelength of the ray aligned with the other set of electrodes.

3. The system according to claim 2 in which said lasing medium comprises neodymium yttrium aluminum garnet, said first and second wavelengths being 1.06 microns and 1.32 microns, respectively.

4. The system according to claim 1 in which said component refracts said beam into a plurality of extraordinary (E) rays having different wavelengths, said electrode means comprising electrodes aligned with said E rays, and means for energizing said electrodes with a voltage corresponding to a selected wavelength to permit propagation of the E ray having the selected wavelength and inhibiting propagation of E rays at otherwavelengths.

5. The system according to claim 4 in which said lasing medium comprises alexandrite, said E rays having wavelengths in the range of approximately 700 nanometers to 800 nanometers.

6. A method of selectively switching the output of a laser having a multiple wavelength beam between a first wavelength and a second wavelength different from said first wavelength, consisting of the steps of refracting said beam into rays having first and second wavelengths, passing said rays through an electrooptically active element having electrode means aligned with said rays, and energizing said electrode means in one mode whereby to inhibit propagation of the ray having the first wavelength while permitting propagation of the ray having the second wavelength to produce a laser output at the second wavelength and in another mode whereby to inhibit propagation of the ray having the second wavelength while permitting propagation of the ray having the first wavelength to produce a laser output at the first wavelength.

7. A method of selectively switching the output of a laser having a multiple wavelength beam between a first wavelength and a second wavelength different from said first wavelength, consisting of the steps of refracting said beam into a first ray having a first polarity and into a second ray having a second polarity and being spatially separated from said first ray, passing said first and second rays through an electrooptically active element having first and second sets of electrodes aligned with said first and second rays, respectively, energizing the first set of electrodes and deenergizing the second set of electrodes whereby to block propagation of said first ray and produce a laser output having said second wavelength and energizing said second set of electrodes and deenergizing said first set of electrodes whereby to block propagation of said second ray and produce a laser output having said first wavelength.

8. A method of selectively switching the output of a laser having a multiple wavelength beam between a first wavelength and a second wavelength different from said first wavelength, consisting of the steps of refracting said beam into a plurality of rays having different wavelengths and the same polarity, passing said rays through an electrooptically active element having a set of electrodes aligned with said rays, selectively energizing said electrodes with one of a plurality of voltages for permitting propagation of one of said rays while inhibiting propagation of the remainder of said rays and producing a laser output at the wavelength of said one ray, and energizing said electrodes at another of said plurality of voltages for permitting propagation of another of said rays while inhibiting propagation of the remainder of said rays and producing a laser output at the wavelength of said another ray.

9. The method according to claim 8 with the additional step of changing the voltages applied to said electrodes at a predetermined frequency whereby to frequency modulate the output of said laser.

10. A method of selectively Q-switching the output of a laser having a multiwavelength medium at selected wavelengths consisting of the steps of refracting said beam into a plurality of rays having different wavelengths and the same polarity, passing said rays through an electrooptically active element having a set of electrodes aligned with said rays, selectively energizing said electrodes with a predetermined voltage for inhibiting propagation of one of said rays during the energy storage build-up time in the said laser medium, and selectively applying an additional voltage to one of said electrodes and permitting propagation of one of said rays and producing a Q-switched laser output at the selected wavelength of said one ray.

* * * * *